Nov. 12, 1957  T. W. MESSICK  2,812,611
SHIELDS FOR FISH HOOKS
Filed March 12, 1956
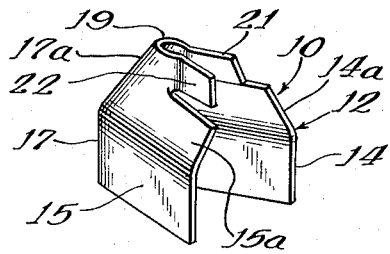
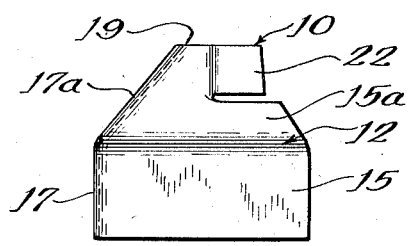
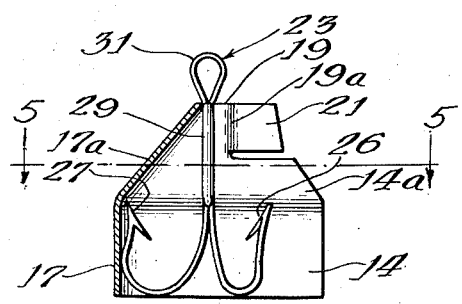
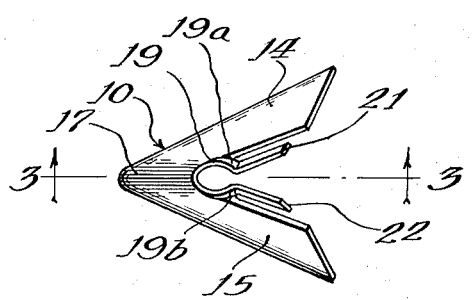
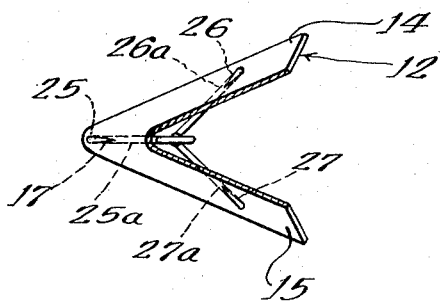
Inventor:
Thomas W. Messick
By: Wallace and Cannon
Attorneys _United States Patent Office_

2,812,611
Patented Nov. 12, 1957

2,812,611
SHIELDS FOR FISH HOOKS
Thomas W. Messick, Mattoon, Ill.

Application March 12, 1956, Serial No. 570,849

9 Claims. (Cl. 43—57.5)

This invention relates to shields or guards for fish hooks, and, more specifically, to shields or guards which are particularly well adapted for use on treble gang hooks.

When fish hooks are carried on the person, or in tackle boxes, and the like, it has always been a problem to prevent the points thereof from pricking the person handling or carrying the same, or from becoming entangled with other objects likewise being carried. This is particularly true of gang hooks such as are commonly used on plugs and other artificial lures.

It is a primary object of my invention to afford a novel shield or guard for fish hooks and, particularly, for treble gang hooks, which is effective to cover the points of such hooks in a manner wherein the hooks may be carried on the person, or in a tackle box, or the like, and may be handled without the danger of the person so handling or carrying the hooks being pricked by the same, and without the danger of the points of the hooks being entangled in the clothing, other gang hooks, or other foreign objects.

Shields or guards for fish hooks have been heretofore known in the art. However, such shields or guards as have been heretofore known have had certain inherent disadvantages such as, for example, being expensive to manufacture; being complicated in construction or operation; requiring the barbs of the hooks to be embedded in material in the shield or guard; not being readily used on lures or plugs; or not being removable from the hook after the hook was attached to a fish line, and the like. It is an important object of my invention to afford a shield or guard for fish hooks which overcomes such disadvantages.

It is another object of my invention to afford a shield for fish hooks which may be quickly and easily mounted in protective position on a fish hook, and removed therefrom, in a novel, simple and expeditious manner.

Another object of my invention is to afford a novel shield of the aforementioned type which is of such shape and construction that it may be readily and economically constructed of suitable resilient material such as plastic, sheet metal, or the like.

A further object of my invention is to afford a novel shield of the aforementioned type which may effectively protectively cover the loops and points of a treble gang hook in a novel and expeditious manner.

Yet another object of my invention is to afford a novel shield of the aforementioned type which may be mounted on, and removed from, a three-barb gang hook with a purely lateral motion relative to the length of the hook.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view of a shield or guard for a treble gang hook embodying the principles of my invention;

Fig. 2 is a side elevational view of the shield shown in Fig. 1;

Fig. 3 is a longitudinal sectional view of the shield shown in Fig. 1, the view being taken substantially along the line 3—3 in Fig. 4;

Fig. 4 is a top plan view of the shield shown in Fig. 1; and

Fig. 5 is a sectional view taken substantially along the line 5—5 in Fig. 3.

A shield or guard 10 embodying the principles of my invention, is shown in the drawings to illustrate the preferred embodiment of my invention.

The shield 10 embodies a substantially V-shaped body member 12 having two side walls 14 and 15 diverging laterally outwardly away from each other from a common apex 17, Figs. 1 and 4, the apex 17 forming an end wall for the body member 12 at what is hereinafter referred to as the rear or back of the shield 10. The upper end portions 14a, 15a and 17a of the side walls 14 and 15 and the apex 17 respectively, slant inwardly toward each other in an upward direction, Fig. 1. A substantially semi-circular shaped collar 19, integral to the side walls 14 and 15 and apex 17, projects upwardly from the walls 14, 15, and 17, and has two forward end portions or jaws 19a and 19b disposed in a closely adjacent and oppositely disposed position relative to each other to afford a passageway through the rim of the collar 19. Two ears 21 and 22 are connected to and project forwardly from the front end portions 19a and 19b respectively, of the collar 19 and flare outwardly from each other in a forward direction, Fig. 4.

From the foregoing it will be seen that the body member 12 is open at the front between the side walls 14 and 15 and tapers inwardly toward the end wall 17, and that the passageway through the rim of the collar 19, defined by the jaws 19a and 19b, likewise opens toward the front.

The shield 10 is preferably made as an integral unit and I prefer to make it of a suitable flexible, resilient plastic such as synthetic thermo-plastic polystyrene resin, although my invention is not limited thereto and it will be appreciated by those skilled in the art that it may be constructed of other suitable materials such as, for example, sheet steel, and the like.

In the drawings, Figs. 3 and 5, my novel shield 10 is shown mounted on a three-barb gang hook 23 having the usual barbed points 25, 26, and 27 connected to the lower end portion of a common shank 29 by three loops 25a, 26a and 27a respectively. An eye 31 is mounted on the upper end portion of the shank 29 in the usual manner.

In mounting the shield 10 on the hook 23, the hook 23 may be moved laterally into the shield 10, with the upper end portion of the shank 29 moving rearwardly between the ears 21 and 22 and the jaws 19a and 19b into the collar 19. The end portions 19a and 19b of the collar 19 are disposed sufficiently close together that in moving the upper end portion of the shank 29 into the collar 19, sufficient force must be applied thereto to flex the end portions 19a and 19b apart. During this rearward movement of the hook 23, one of the points, such as the point 25, projects in the general direction of the apex 17 of the shield 10 so that it is guided by the side walls 14 and 15 into abutting engagement with the inner surface of the apex 17. At this same time, the other two points, such as the points 26 and 27 are moved into abutting engagement with the inner faces of the side walls 14 and 15 respectively, Figs. 3 and 5.

When the hook 23 is disposed in stored, or carrying position in the shield 10, the eye 31 preferably rests on top of the upper edge of the collar 19 and the side walls of the collar 19, rearwardly of the ends 19a and 19b, clampingly engage the upper end of the shank 29 and the lower end portion of the eye 31. The jaws 19a and 19b move back toward each other, after the passage of the upper end portion of the shank 29 therebetween, so as to afford effective stop members for yieldingly restraining dislodgment of the hook 23 from the shield 10. The points 25—27 of the hook 23, at this time, underlie the upper portions 17a of the apex 17, and the upper portions 14a and 15a of the side walls 14 and 15, respectively, and the hook 23 is thereby restrained against upward movement relative to the shield 10. I prefer to make the side walls 14 and 15 of such height that when the hook 23 is thus disposed in the shield 10, no part of the points 25—27 or loops 25a—27a, project below the lower edges or side edges thereof.

When it is desired to remove the hook 23 from the shield 10, it may be readily accomplished by merely grasping the shield in one hand and the eye 31 of the hook 23 in the other hand and pulling forwardly on the eye 31 with sufficient force to move the shank 29 outwardly between the jaws 19a and 19b.

It will be seen that with my novel shield, a hook such as the hook 23 may be moved into protected position by a purely lateral movement of the hook 23 relative to its length, and that when disposed in the shield 10, the points 25—27 of the hook 23 are effectively protected against snagging or entangling without side objects. Also, it will be seen that if desired, a fish line may be tied or otherwise connected to the eye 31 of the hook 23 while the hook 23 is still disposed in protected position in the shield 10, and that the shield 10 may thereafter be readily removed from the hook 23 by merely moving the hook 23 laterally in a forward direction relative to the shield 10.

From the foregoing it will be seen that I have afforded a novel shield or guard for fish hooks which may be readily and economically produced commercially, may be readily used, and is effective and efficient in operation.

Thus, while I have illustrated and described the preferred embodiment of my invention, it is to be understood that it is capable of variation and modification, and I therefore do not wish to be limited to the precise details set forth, but desire to avail myself of such changes and alterations as fall within the purview of the following claims.

I claim:

1. A shield for a gang hook having a plurality of barbs comprising a substantially V-shaped body member having one open side, and a supporting member on said body member in position to supportingly engage such a hook when the latter is moved laterally through said open side into position in said body member wherein said barbs are disposed in said body member.

2. A shield for a gang hook comprising two side walls joined together at a common apex and flaring outwardly relative to each other from said apex, guide members mounted on said side walls, and a supporting member mounted on said side walls in position to supportingly engage such a hook upon lateral movement of the latter inwardly between said side walls and said guide members.

3. A shield for a three-point gang hook comprising two side walls having inwardly tapering upper end portions, said side walls being joined together at a common apex and flaring outwardly away from each other from said apex to form a housing having a substantially V-shaped cross-section and an open side, and clamping means mounted on said side walls and having an opening therein facing in the same direction as said open side, said side walls and clamping means being so positioned that such a hook may be moved laterally through said opening and said open side into position wherein one of the points of said hook is disposed in said apex and the other two points of said hook are disposed between said side walls, said clamping means being engageable with said hook when the latter is disposed in said position to support said hook in said position.

4. A shield for a three-point gang hook comprising two walls connected together at a common apex and flaring outwardly away from each other from said apex, said walls and said apex being disposed in such a position relative to each other as to define a storage area wherein such a hook may be disposed in stored position with the points thereof disposed in engagement with said apex and walls within said storage area and with the upper end portion of the shank thereof projecting outwardly from said storage area, and a supporting collar mounted on said walls in position to supportingly engage said upper end portion of said shank when said hook is in said position, said collar having an opening therein through which said shank may be moved with a purely lateral movement into said engagement with said collar during movement of said hook into said stored position.

5. A shield for a gang hook having an elongated shank with three points at the lower end portion thereof, and an eye at the upper end portion thereof, said shield comprising means for supportingly engaging said upper end portion of such a hook to support said hook in depending stored position therefrom, an end wall, and two side walls slanting outwardly away from each other from said end wall, said end wall and side walls being positioned to engage a respective one of said points when said hook is disposed in said stored position, and said walls having inwardly projecting portions disposed in position to overlie said points when said hook is disposed in said stored position to restrain upward movement of said hook relative to said first named means.

6. A shield for a gang hook having an elongated shank with three points at the lower end portion thereof, and an eye at the upper end portion thereof, said shield comprising means for yieldingly engaging said upper end portion of such a shank in underlying relation to said eye for supporting said hook in depending stored position therefrom, a substantially V-shaped base positioned to support said means, said base and said means having openings therein through which said hook may be moved laterally into said stored position, said base being positioned to overlie said points and project outwardly therefrom in all directions when said hook is disposed in said stored position.

7. A shield for a gang hook having an elongated shank with three points at the lower end portion thereof, and an eye at the upper end portion thereof, said shield comprising means for yieldingly engaging said upper end portion of such a shank in underlying engagement with said eye for supporting said hook in depending stored position therefrom, a substantially V-shaped base underlying said means in supporting relation thereto, said base and said means having openings therein through which said hook may be moved with a purely lateral movement into said stored position, said opening in said means being defined by yielding jaws normally disposed closer to each other than the thickness of said shank, and said base being positioned to coveringly engage said points when said hook is disposed in said stored position.

8. A shield for a gang hook having a substantially straight elongated shank with three points projecting laterally from a lower end portion thereof and an eye mounted on the upper end portion thereof, said shield comprising two side walls connected together at one end to form an end wall, said walls each having a substantially upright lower edge portion and an inwardly slanting upper edge portion, said walls defining a storage area for said points of such a hook, a split collar mounted on and projecting upwardly from said upper edge portions of said walls and having yielding jaws defining a passageway therethrough, said jaws being normally disposed closer together than the thickness of said upper end portion of said shank, said jaws and side walls being so positioned that said hook may be moved with a purely lateral movement relative to said elongated shank into and out of stored position relative thereto, with said points moving between said side walls, and said shank moving between said jaws, said collar being so positioned that, when said hook is disposed in said stored position, said collar is disposed in supporting engagement with said eye, and said walls being so positioned that, when said hook is disposed in said stored position, one of said points is disposed adjacent to the inner face of said end wall, and each of the other two of said points is disposed adjacent to the inner face of a respective one of said side walls, and said upper end portion of said walls overlie said points in position to restrain upward movement of said hook relative to said walls.

9. A shield for a gang hook having a substantially straight elongated shank with three points projecting laterally from a lower end portion thereof and an eye mounted on the upper end portion thereof, said shield comprising two side walls connected together at one end to form an end wall integral therewith, said walls being constructed of flexible resilient sheet material and each having a substantially upright lower edge portion and an inwardly slanting upper edge portion, said walls defining a storage area for said points of said hook, a supporting collar mounted on and projecting upwardly from said upper edge portions of said walls, said collar being integral with said walls and having two yielding jaw portions defining a passageway therethrough, said jaw portions being normally disposed closer together than the thickness of said upper end portion of said shank, guide flanges integral with said collar and projecting outwardly from said jaws, said jaws and side walls being so positioned that said hook may be moved with a purely lateral movement relative to said elongated shank into and out of stored position relative thereto with said points moving between said side walls, and said shank moving between said jaws and said guide flanges, said collar being so positioned that, when said hook is disposed in said stored position, said collar is disposed in underlying engagement with said eye, said walls being so positioned that, when said hook is disposed in said stored position, one of said points is disposed in abutting engagement to the inner face of said end wall, and each of the other two of said points is disposed in abutting engagement to the inner face of a respective one of said side walls, said upper end portions of said walls overlie said points in position to restrain upward movement of said hook relative to said walls, and each of said walls projects outwardly in all directions from the points disposed in engagement therewith.

References Cited in the file of this patent

UNITED STATES PATENTS 2,616,209  Ploen _____ Nov. 4, 1952

FOREIGN PATENTS 297,759  Switzerland _____ June 16, 1954